United States Patent
Borunda et al.

(10) Patent No.: US 10,630,648 B1
(45) Date of Patent: Apr. 21, 2020

(54) SYSTEMS AND METHODS FOR FACILITATING DIGITAL DOCUMENT COMMUNICATION

(71) Applicant: United Services Automobile Association (USAA), San Antonio, TX (US)

(72) Inventors: Adrian Borunda, Celina, TX (US); Andrew L. Anaruk, San Antonio, TX (US); Heather Hernandez, San Antonio, TX (US); Gunjan C. Vijayvergia, San Antonio, TX (US); William H. Wright, III, Helotes, TX (US); John Shelton, San Antonio, TX (US); Cory S. Pickrel, Austin, TX (US); Minya Liang, Redmond, WA (US); Sudarshan Rangarajan, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 43 days.

(21) Appl. No.: 15/427,898

(22) Filed: Feb. 8, 2017

(51) Int. Cl.
*H04L 29/06* (2006.01)
*H04L 9/08* (2006.01)

(52) U.S. Cl.
CPC ............ *H04L 63/0428* (2013.01); *H04L 9/08* (2013.01)

(58) Field of Classification Search
CPC ..... H04L 63/0428; H04L 63/08; H04L 63/04; H04L 63/0435; H04L 63/0442; H04L 9/08; H04L 9/0822; H04L 9/0827; H04L 9/083

USPC ....... 713/150, 151, 155, 159, 165, 171, 172, 713/185
See application file for complete search history.

(56) References Cited

U.S. PATENT DOCUMENTS

| | | | |
|---|---|---|---|
| 7,043,754 B2 | 5/2006 | Arnouse | |
| 7,161,563 B2 | 1/2007 | Vitale et al. | |
| 7,716,745 B2 * | 5/2010 | Peinado | G06F 21/10 705/59 |
| 8,606,293 B2 | 12/2013 | Kim et al. | |

(Continued)

FOREIGN PATENT DOCUMENTS

WO   WO 2015036957   3/2015

OTHER PUBLICATIONS

Copenheaver, International Search Report and Written Opinion for International application No. PCT/US2016/025534, dated Jun. 30, 2016, 6 pages.

(Continued)

*Primary Examiner* — Michael Simitoski
*Assistant Examiner* — Tarek Elarabi
(74) *Attorney, Agent, or Firm* — Fish & Richardson P.C.

(57) ABSTRACT

Methods, systems, and apparatus, including computer programs encoded on computer storage media, to provide digital identification. One of these methods includes receiving a request for a digital document from a digital wallet executing on a mobile device. The method includes identifying a digital document provider capable of providing the requested document. The method includes sending the request for the digital document to the identified digital document provider. The method includes receiving, from the digital document provider, information that enables the mobile device to view the digital document and does not enable the computer system to view the digital document.

6 Claims, 15 Drawing Sheets

(56) References Cited

U.S. PATENT DOCUMENTS

| | | | |
|---|---|---|---|
| 9,002,944 | B2 | 4/2015 | Lewis |
| 9,325,807 | B1 | 4/2016 | Meoli et al. |
| 9,509,686 | B2 * | 11/2016 | Anantha ............... H04L 9/0897 |
| 9,721,147 | B1 * | 8/2017 | Kapczynski ......... G06Q 50/265 |
| 2007/0164103 | A1 | 7/2007 | Berkowitz et al. |
| 2008/0109362 | A1 | 5/2008 | Fransdonk |
| 2008/0176533 | A1 * | 7/2008 | Leleu ................. G06Q 20/1235 |
| | | | 455/411 |
| 2009/0119757 | A1 | 5/2009 | Acuna |
| 2010/0154041 | A1 | 6/2010 | Dalzell |
| 2012/0090038 | A1 * | 4/2012 | Pacella et al. .......... G06F 21/00 |
| | | | 726/30 |
| 2012/0290468 | A1 | 11/2012 | Benco |
| 2013/0073460 | A1 | 3/2013 | Paquin |
| 2013/0212661 | A1 | 8/2013 | Neafsey |
| 2013/0219178 | A1 * | 8/2013 | Xiques ................... H04L 9/083 |
| | | | 713/168 |
| 2013/0274003 | A1 | 10/2013 | Costello |
| 2013/0275303 | A1 | 10/2013 | Fiore |
| 2013/0339747 | A1 | 12/2013 | Gangi |
| 2014/0172474 | A1 | 6/2014 | Partridge |
| 2014/0279111 | A1 | 9/2014 | Mahaffey |
| 2014/0279611 | A1 | 9/2014 | Evans |
| 2015/0067344 | A1 | 3/2015 | Poder et al. |
| 2015/0081538 | A1 | 3/2015 | Renard |
| 2015/0127730 | A1 | 5/2015 | Aviv |
| 2016/0065558 | A1 | 3/2016 | Suresh |
| 2016/0210699 | A1 | 7/2016 | Meoli et al. |
| 2016/0294831 | A1 * | 10/2016 | Borunda ................. H04L 63/08 |
| 2016/0380774 | A1 * | 12/2016 | Lovelock et al. ........ H04L 9/32 |
| 2017/0140174 | A1 | 5/2017 | Lacey |
| 2017/0180344 | A1 | 6/2017 | Gupta |

OTHER PUBLICATIONS

U.S. Appl. No. 62/138,555, filed Mar. 26, 2015, Lovelock.
International Preliminary Report on Patentability, for International application No. PCT/US2016/025534, dated Oct. 12, 2017.
European Search Report in European Application No. 16774303.8, dated Mar. 14, 2018, 6 pages.

* cited by examiner

SYSTEMS AND METHODS FOR FACILITATING DIGITAL DOCUMENT COMMUNICATION

BACKGROUND

Identification documents may be used to verify aspects of a person's personal identity. If issued in the form of a small, mostly standard-sized card, it is usually called an identity card (ID or ID card). Countries which do not have formal identity documents may require identity verification using informal documents.

In the absence of a formal identity document, driving licenses may be accepted in many countries for identity verification. Some countries do not accept driving licenses for identification, often because in those countries they do not expire as documents and can be old or easily forged. Most countries accept passports as a form of identification.

Identification documents may also be used to verify an individual's membership in a group. For example, student identification cards are used as proof that the individual is a student, faculty, or staff at a school. Military identification cards are used as proof that the individual is a member of the armed services.

SUMMARY

This specification describes technologies relating to digital identification.

In general, one innovative aspect of the subject matter described in this specification can be embodied in methods that include the act of receiving a request for a digital document from a digital wallet executing on a mobile device. The methods include the act of identifying a digital document provider capable of providing the requested document. The method includes the act of sending the request for the digital document to the identified digital document provider. The method includes the act of receiving, from the digital document provider, information that enables the mobile device to view the digital document and does not enable the computer system to view the digital document.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The information may include a token, the token enabling the mobile device to obtain the digital document from the digital id provider. The information may include the digital document encrypted using an encryption key. A key to decrypt the digital document may be stored on the mobile device. The information may also include a token, the mobile device sends the token to the digital document provider, and the digital document provider sends the key to decrypt the encryption container to the mobile device.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Identification documents service an important role. They are used to verify that an individual is who they purport to be. Identification documents are also used to verify that an individual is a member of class of individuals entitled to certain privileges. For example, a driver's license demonstrates that a user is entitled to drive. A student identification card demonstrates that an individual is affiliated with a particular school. A military identification card demonstrates that an individual is a member of the armed services.

Physical cards have short comings. They can be lost, stolen, or forged. An individual may need to carry multiple identification cards, which may be unwieldly. Identification documents can be stored or accessed using a client device. In some implementations, identification documents can be stored or accessed using a client device. In some implementations, identification document access can be integrated into a digital wallet or similar application. Digital identification has the advantage of being able to be provided electronically, rather than physically, which in turn reduces the likelihood that the identification will be lost or stolen. Digital identification also allows for real-term validation that the ID is still active (for example, that the ID has not been revoked) unlike a physical ID which can only show if the ID is expired.

Figure 1:
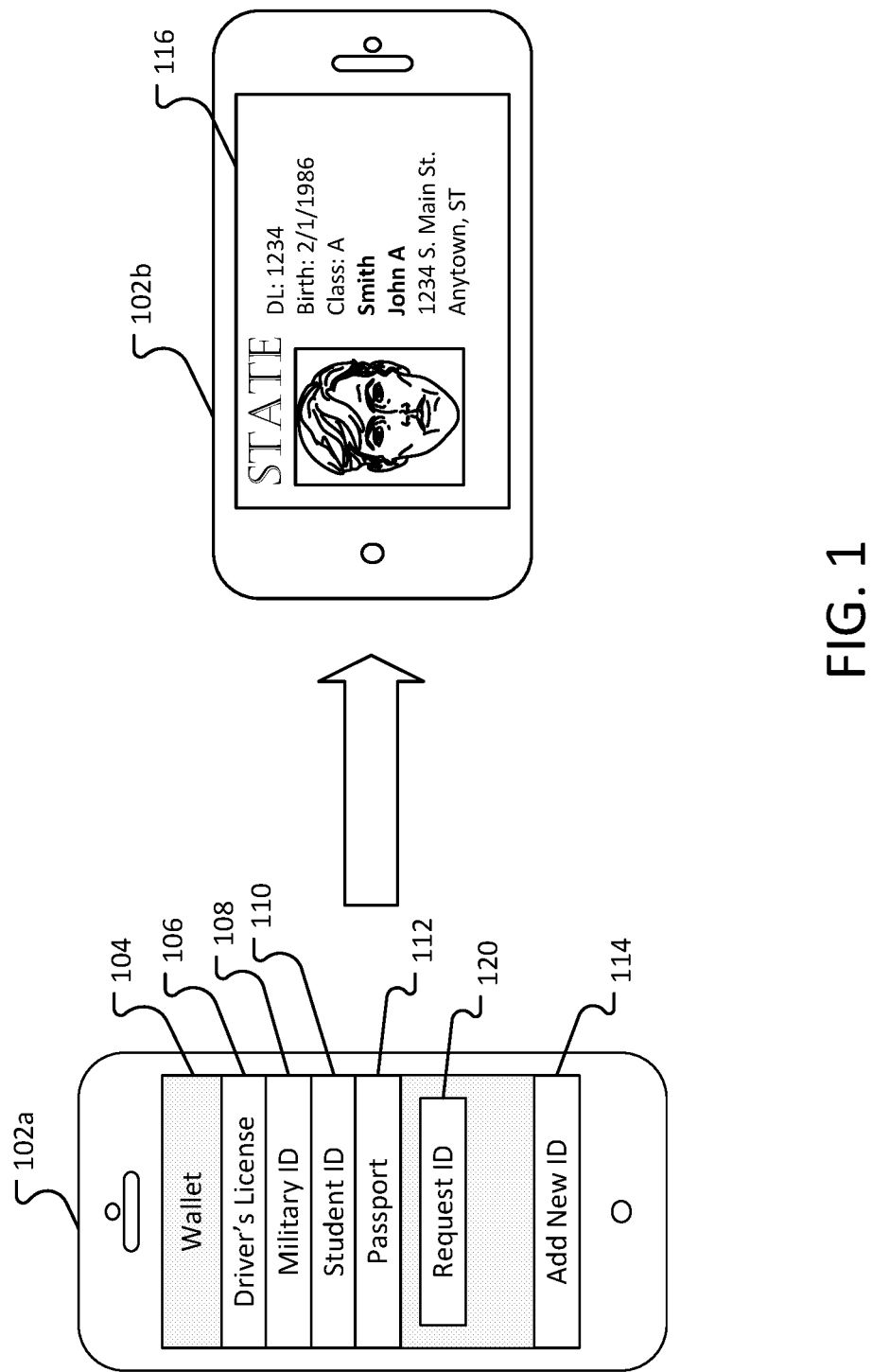
FIG. 1 is an example of a digital wallet application executing on a client device.

FIG. 1 is an example of a digital wallet application executing on a client device. The client device can be, for example, a mobile device (such as a smart phone, a tablet, a notebook, personal digital assistant, a dedicated wallet device, a wearable computing device, or any other portable device capable of sending and receiving messages over a network). The client device can also be devices integrated into the Internet of Things, such as a smart home, devices within the home, a smart car, other Internet connected devices, etc. The client device 102*a* includes a digital wallet application 104. Within the digital wallet is information about different available digital identification documents. In this example, the digital wallet has a driver's license 106, a military id 108, a student id 110, and a passport 112. Other types of identification and permits can also be stored in the digital wallet, including but not limited to firearm permits, hunting licenses, medical licenses, military identification, insurance cards, bar admission cards, and a Naturalization and Immigration Services (NIS) Cards. In some implementations, the digital wallet only displays information about digital identification documents to which the application has access.

Information in the digital wallet may also establish relationships between individuals, such as legal guardianship and spousal relationships.

In some implementations, the digital wallet application 104 includes a selectable item 114 (for example, a button or a link) that enables the user to add a new form of identification to the system. In some implementations, the driver's license may be requested, for example, by selecting the appropriate identification and selecting the Request ID button 120. In some implementations, the driver's license may be requested, for example, by voice activation and/or double tapping the driver's license item 106.

The user can select a form of digital identification to present on the client device 102*a*. In this example, the user selects the driver's license 106. The user interface of the client device 102*b* can update the display the user's driver's license 116.

Figure 2:
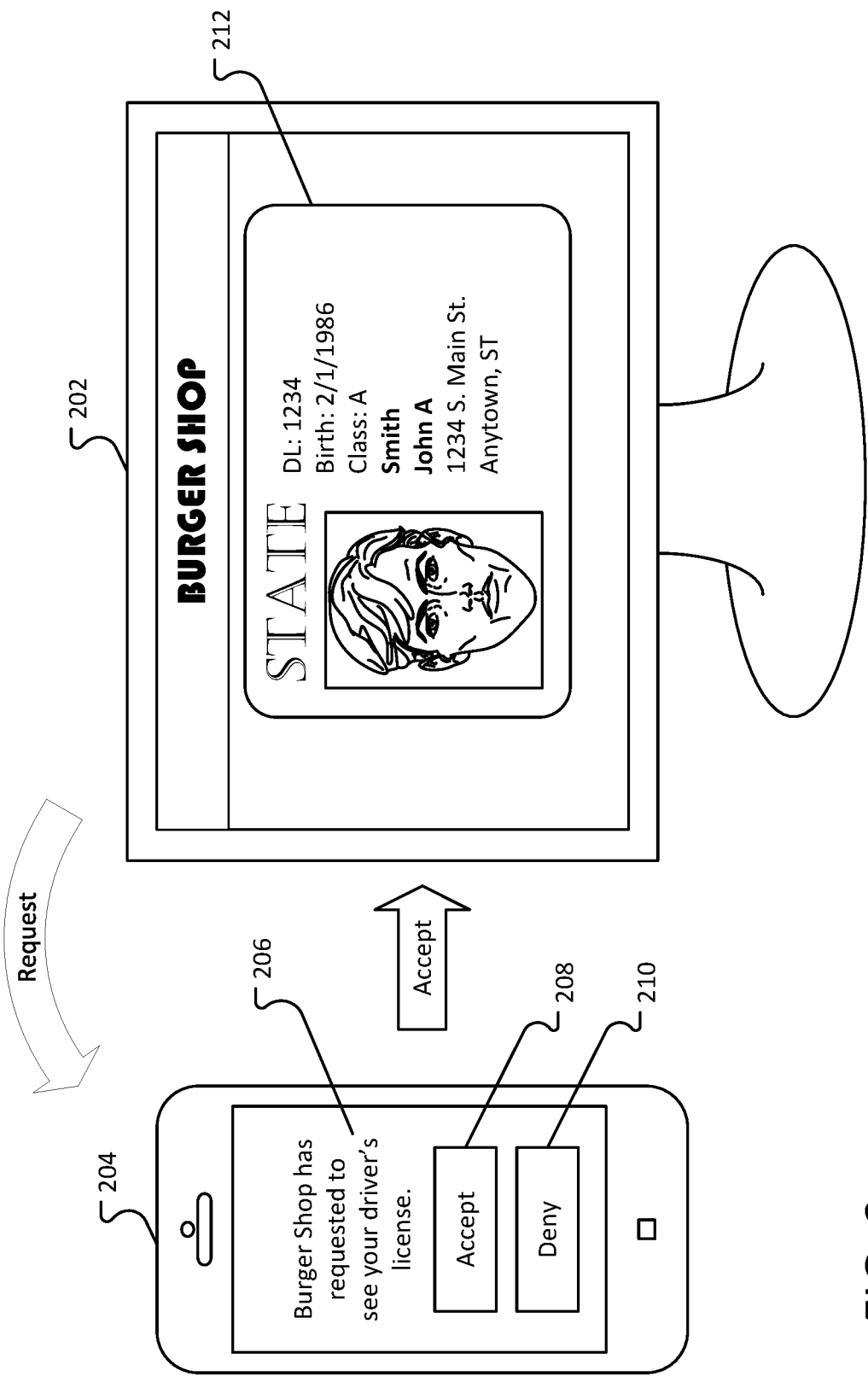
FIG. 2 illustrates providing a digital identification 212 to a computing device 202.

FIG. 2 illustrates providing a digital identification 212 to a computing device 202. A computing device 202 may request identification from the client device 204. In some implementations, the computing device 202 can be executing an application that is capable of sending a request to the client device 204. For example, the application executing on the computing device 202 and the app executing on the client device 204 may be in communication through a separate system such as a server (not shown).

The client device 204 receives the request for the driver's license and displays a message 206 on the screen. The request may include the identity of the individual, company, or system requesting the identification. In this example, Burger Shop has requested to see a driver's license. In some implementations, the computing device 206 can request a particular form of identification, such as a driver's license or a passport. In some implementations, the computing device 202 may request any form of identification sufficient to demonstrate some fact about the user, such as age or citizenship.

In some implementations, the client device 204 may proactively offer the driver's license. The driver's license may be offered to particular entity (for example, the Burger Shop, a law enforcement officer, etc.) or may be generally presented to whomever requests it. In some implementations, the driver's license may be offered to a particular type of entity (for example, any bar or restaurant, any law enforcement officer, an immigration agent, etc.).

The user of the client device 204 may accept 208 or deny 210 the request. If the user accepts the request, the user's driver's license 212 is displayed on the computing device 202 of the requesting party. The computing device 202 may display the user's digital identification, but in some instances it may only display a decision or determination that is relevant to the person requesting the identification. For example, an age verification requested by a retail store may only need to know that digital identification holder is old enough to purchase alcohol. Therefore the computing device may display a YES or NO depending on whether the identification holder is old enough to purchase alcohol or not. Other examples include authorization to enter a venue or event (for example, if the client device 204 contains a ticket to the venue or event), authorization to board a transport (for example, a plane, ship, bus, or train), and authorization to vote (for example, the client device 204 is used to access a voter registration).

In some implementations, business rules may determine whether or not a request is legitimate. For example, the GPS location of the requester and the GPS location of the client device may be compared, the system may compare items purchased by the user to determine if any purchased item requires proof of age, etc.

Communication between the client device 204 and the computing device 202 may be performed using point to point communication technologies (for example, near field communication (NFC), BLUETOOTH, etc.) or may be performed using communication with an application service, described further below).

In some implementations, the driver's license may be offered only for a limited amount of time. For example, the recipient of the driver's license may only have a predetermined period of time (for example, 20 seconds, 30 seconds, 1 minute) to view the driver's license. In some implementations, the recipient of the driver's license may only have a limited period of time to accept an offer to view a driver's license (for example, 15 seconds, 30 seconds, 1 minute), but once viewed, may view it for a longer period of time (for example, 5 minutes, 10 minutes, an hour, indefinitely).

In some implementations, the application executing on the computing device 202 and or the digital wallet/client device can detect when a picture, snap shot, or screen shot of the digital driver's license (or other digital license or identification stored in the digital wallet) is made. The system may generate an alert that potential identify theft and unlicensed capturing of sensitive information has occurred.

Figure 3:
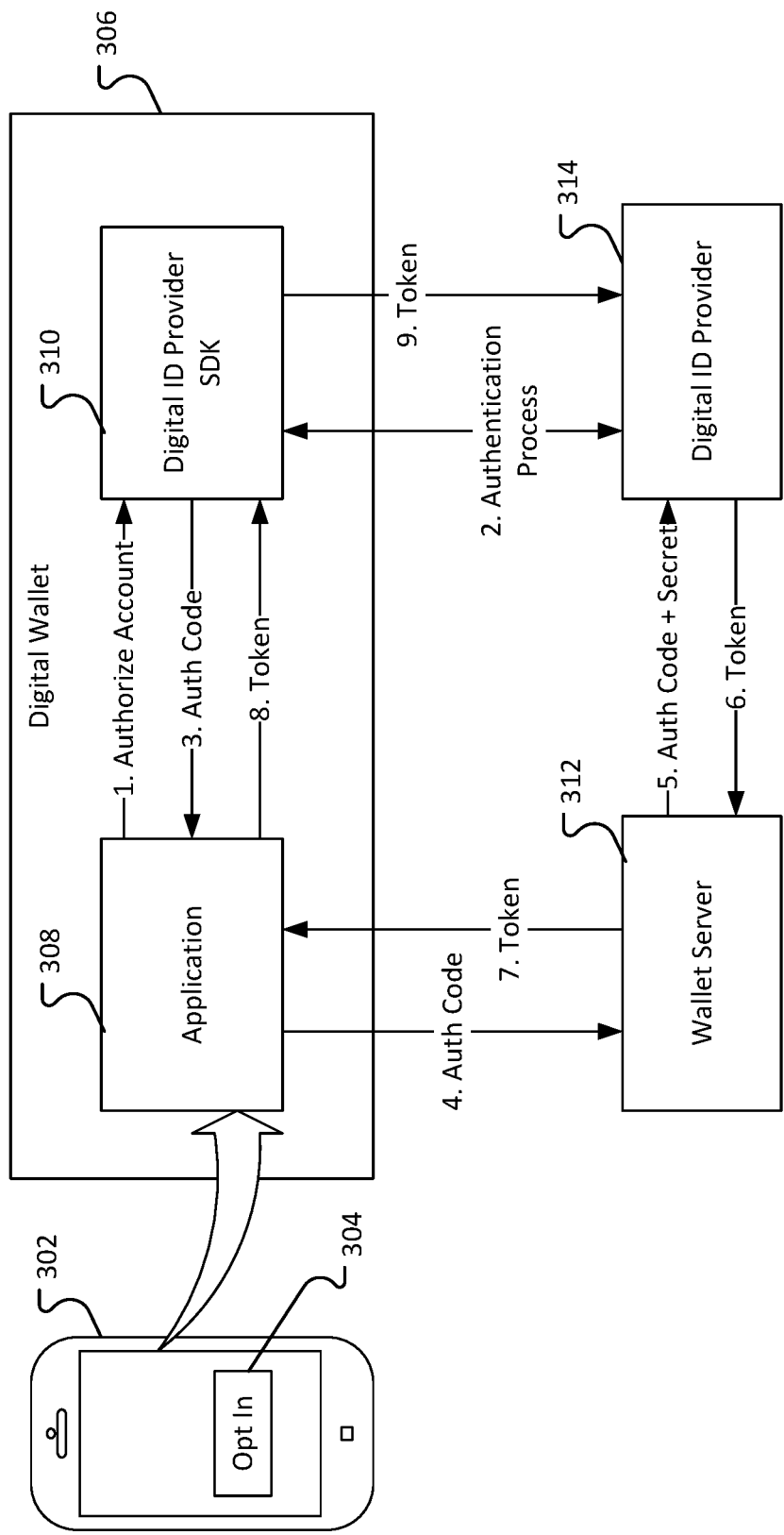
FIG. 3 illustrates an example of integrating a digital wallet with a digital ID provider.

FIG. 3 illustrates an example of integrating a digital wallet with a digital ID provider 314. The digital wallet 306 executes on the client device 302. The user of the client device 302 indicates that he wishes to store and retrieve digital identification using a digital wallet 306. The user can be presented with a screen that explains the legal issues surrounding the use of the digital identification service, including but not limited to an end user license agreement. The user is given the option of opting in 304 to the use of the digital identification service.

In some implementations, the digital wallet may integrate with a digital ID provider 314. The digital ID provider 314 may require that certain communication with the digital ID provider 314 be secured using a secret (for example, a client key and client secret). For example, the digital identification service may require, for example, that the communication or part of the communication be encrypted or digitally signed. The communication can be encrypted, for example, using a public key-private key or using a symmetric key. A digital signature can be applied using the public key/private key infrastructure.

The digital identification service may provide a software development kit (SDK) to enable external applications to integrate with the digital identification service. In this example, the digital wallet 306 includes an application 308 that provides functionality to the digital wallet 306 and also includes a digital ID provider SDK 310 that enables the digital wallet to access the digital ID providers 314. To enhance security, in some implementations, the secret (for example, client key and client secret) is not stored on the client device 302, but is instead stored on a wallet server 312. Therefore, communications requiring the use of a secret occur from the wallet server 312 to the digital ID provider 314. The wallet server can serve as a proxy server to transport information to and from the digital ID provider SDK 310 and the digital ID provider 314.

When the user opts into using the digital wallet to store identification documents, the application 308 requests that the digital ID provider SDK 310 authorize the user and the client device 302 to use the digital ID provider 314.

The digital ID provider SDK 310 can prompt the digital ID provider 314 to create and authorize an account. The digital ID provider 314 can generate an authentication code and provides the authentication code to the digital ID provider SDK 310, which, in turn, can provide the authentication code to the application 308. The application can provide the authentication code to the wallet server 312 using a secure connection.

The wallet server 312 can send the authentication code and the secret to the digital ID provider 314.

The digital ID provider 314 compares the provided authentication code to a stored authentication code. If the provided authentication code matches the stored authentication code, the digital ID provider 314 registers the user.

The digital ID provider 314 provides an access token with a refresh token to the wallet server 312. The wallet server 312 provides the access token with the refresh token to the application 308. The application provides the access token with the refresh token to the digital ID provider SDK 310. The digital ID provider SDK 310 provides the access token with the refresh token to the digital ID provider 314.

In response to receiving the token, digital ID provider 314 associates the client device 302 and/or the digital wallet 306 with the user. The token may include encrypted material that can be accessed using an encrypted key. For example, the digital ID provider 314 may provide the encryption key to the digital ID provider SDK 310.

Figure 4:
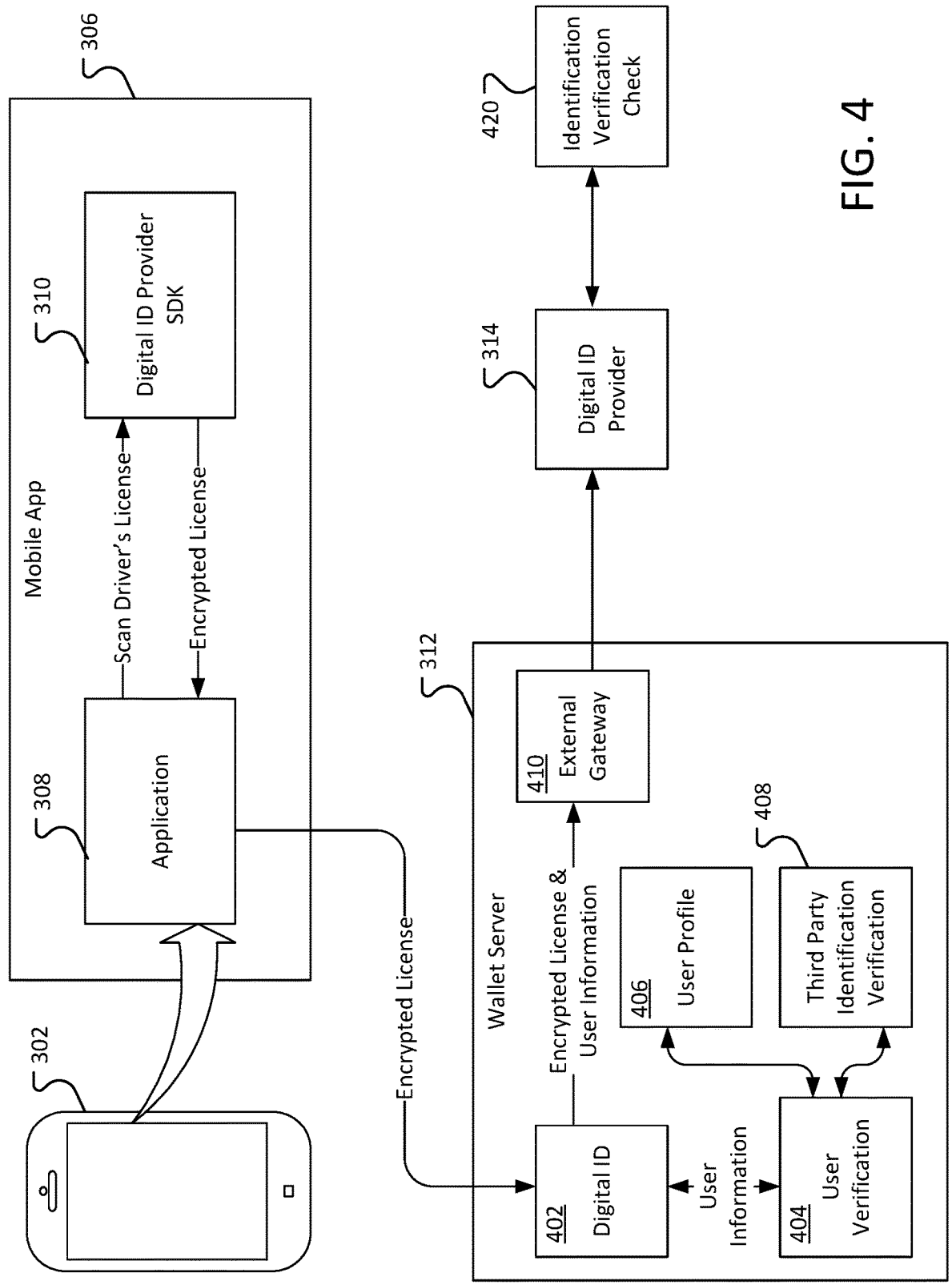
FIG. 4 illustrates an example of adding an identification document to a digital wallet.

FIG. 4 illustrates an example of adding an identification document to a digital wallet. While this example refers to a driver's license, the process described herein may be used to store other forms of identification, including but not limited to Military ID, Student ID, and Passports.

The user can use the mobile app 306 to obtain a digital image of his driver's license. For example, the user may use a camera associated with the client device 302 to take a picture of the driver's license. Alternatively, or additionally, the user may scan their driver's license using a conventional scanner and transfer the scanned driver's license to the client device 302. In some implementations, the user is asked to scan a bar code, QR code, or other data bearing code that is shown on driver's license.

The image of the driver's license or bar code is provided to the digital ID provider SDK 310. In other implementations, the Application 308 instructs the Digital ID Provider SDK 310 to scan the driver's license (for example, using the camera). In this manner, the Application 308 may add a driver's license (or other form of government issued identification) without having unencrypted access to the driver's license (or other form of government issued identification). Scanning the driver's license can include taking a picture of the driver's license and/or obtaining an image or scan of a bar code, QR code or other identifier associated with the license.

The digital ID provider SDK encrypts the image of the driver's license or scanned code using a public key associated with the digital ID provider 314. In some implementations, the public key is stored on the client device 302 and is accessible by the digital ID provider SDK 310. In some implementations, the digital ID provider SDK 310 may obtain the public key from the provider 314, for example, through a network request.

The digital ID provider SDK sends the encrypted payload to the application 308. The Application 308 sends the encrypted payload to a digital ID module 402 on the wallet server 312. As the wallet server 312 does not possess the private key of the provider 314 the wallet server cannot decrypt the encrypted payload.

The wallet server 312 can obtain additional information about the user. For example, the wallet server may use a user verification module 404 to determine whether the user is a verified user. In some implementations, determining whether a user is verified includes obtaining a user profile 406 of the user. The user profile 406 may include information that can be used to determine whether the user has accounts with a financial institution. For example, the user may have bank account, insurance, or an investment account with the financial institution. Some accounts may include sufficient information to verify the user (for example, a bank account or life insurance account). Other accounts may not include sufficient information to verify the user (for example, a property and casualty insurance account).

The wallet server also may provide additional information about the user to the digital ID provider Server. This additional information is owned by the wallet server 312 and can be used by the digital ID provider 314 for further verification of the request. The additional information may include identification information about the use stored in the wallet server 312 (such as a customer number). The additional information can also be user specific data such as first name, last name, social security number, etc.

If the user can be verified, the wallet server 312 collects information about the user.

If the user cannot be verified, information about the user may be obtained through a third party identification verification system 408.

The information about the user (if available) and the encrypted payload is provided to an external gateway 410 that manages communications with the digital ID provider 314. The External Gateway may send the encrypted payload and the user data (secured by the secret, as described above) to the digital ID provider 314.

The digital ID provider 314 can decrypt the image of the driver's license or scanned code using the digital ID provider's private key.

If the user has been verified the digital ID provider 314 may store the decrypted driver's license for later retrieval. In some implementations, the image of the driver's license or scanned code may be stored in encrypted form. In some implementations, the digital ID provider 314 may use information derived from the scanned code to obtain additional driver's licenses details from a third party (such as the issuer of the driver's license).

If the user has not been verified, the digital ID provider 314 can use the image of the driver's license or scanned code and any provided user data to verify the driver's license with an Identification Verification Check 420. For example, with the appropriate governmental agency (such as the Department of Motor Vehicles, Department of State, a Military Branch, or similar institution). In some implementations, the digital ID provider may contract with a third party (such as EXPERIAN) to verify the ID. In some implementations, the digital ID provider 314 may verify the user even if the user has been verified by the wallet server.

Other information about the user may also be stored. For example, the license plate number of a registered vehicle may be stored in association with the digital driver's license. Similarly, a rental car agency may associate a digital driver's license with a rented automobile for the duration of the rental. In some implementations, a digital driver's license may be associated with a financial payment instrument (such as a credit card). The digital driver's license may be associated with a rental automobile based on the use of the credit card to rent the automobile. The digital driver's license may be associated with other appropriate transactions or object based on similar activity.

Figure 5A:
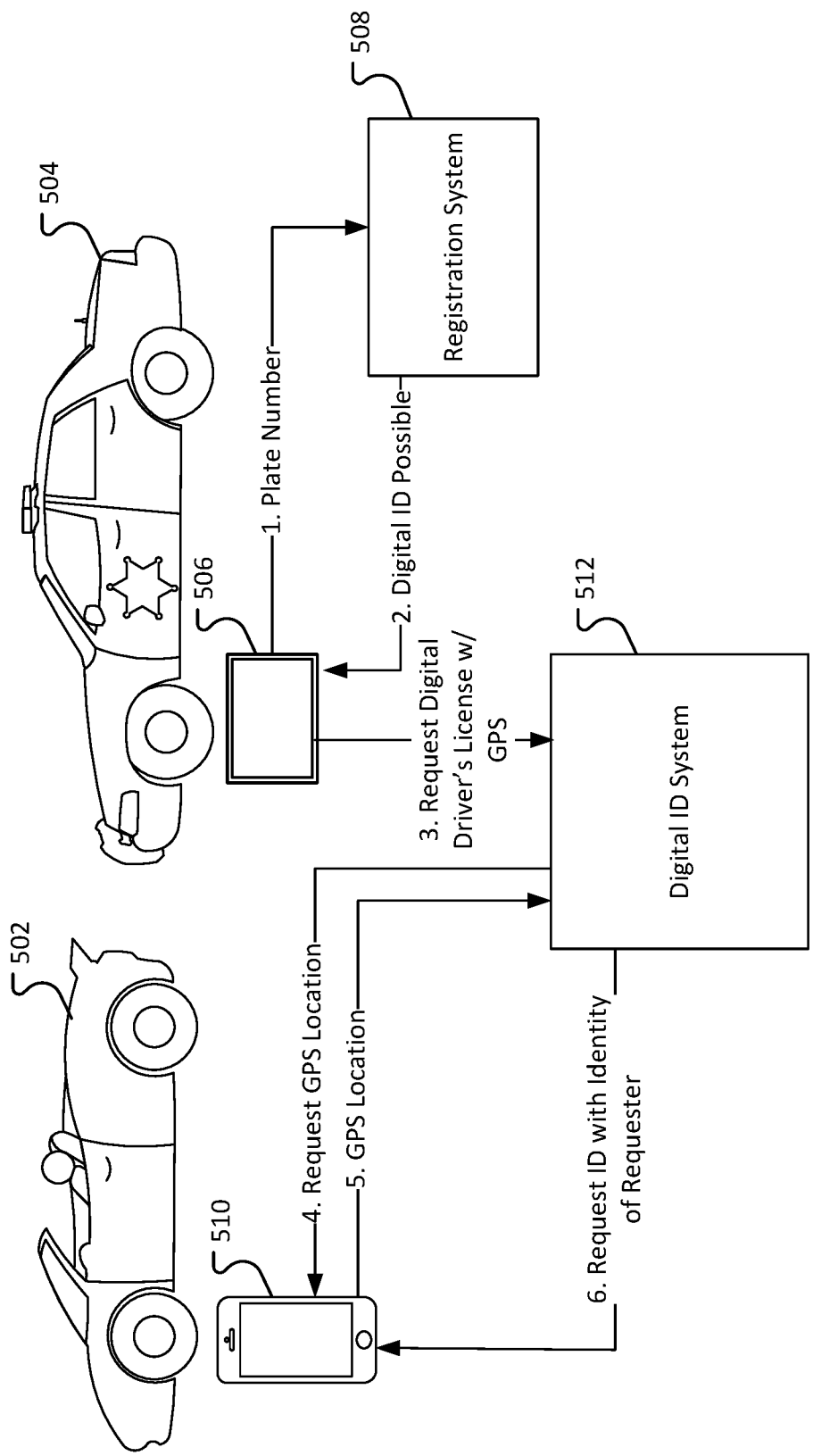
FIGS. 5A-5B illustrate an example of providing a digital identification document to a third party.
Figure 5B:
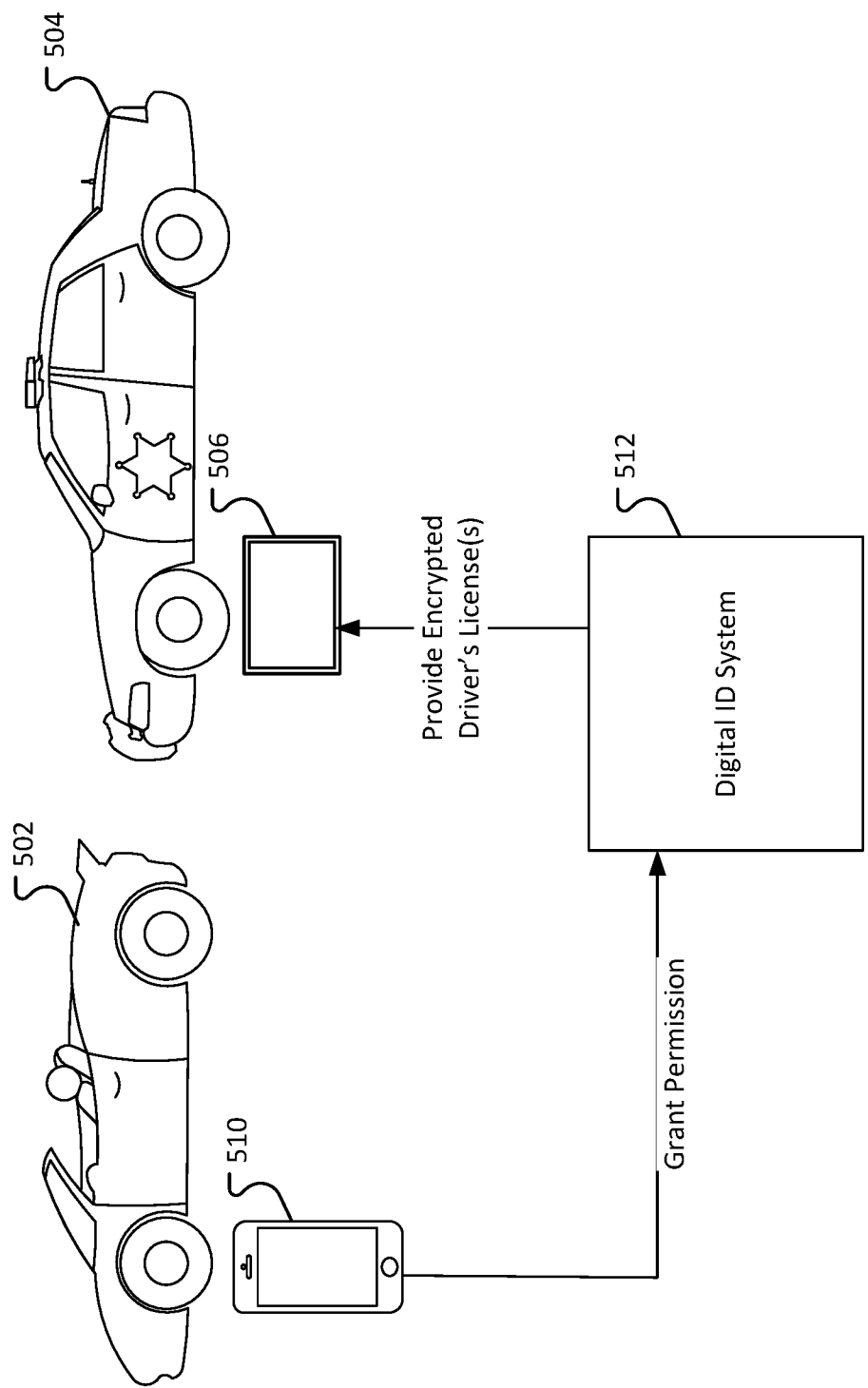

FIGS. 5A-5B illustrate an example of providing a digital identification document to a third party. While this example refers to a digital driver's license and a law enforcement officer, a similar process can be used to provide other forms of digital identification to other parties. For example, the process may be used to present a passport to an immigration or customs officer.

In this example, a car 502 is pulled over by a law enforcement officer 504. The law enforcement officer obtains an identifier for the car 502 in his computer 506 (in this example, a license plate number but other identifier such as an identifier on a decal may also be used). For example the license plate number may be manually entered, may be scanned using a camera or scanning device. The license plate number could be obtained using NFC, RFID, or another communication mechanism to obtain the information from the license plate or from the car 502. The computer sends the license plate number to a registration system 508. The registration system may be, for example, a law enforcement database, an insurance database, a governmental database, or a digital identification database.

Other methods may be used to determine that the driver possesses a digital driver's license. For example, a sticker or decal may be placed on the car to notify the law enforcement officer that the driver is likely to have a digital driver's license. In some implementations, the other method may also include an identifier (for example, number, bar code, QR code, etc.) that notifies that enables the law enforcement officer to look up the digital driver's licenses associated with the identifier. In some implementations, computers or media included in the dash board of the car may be able to identify that the driver has a digital driver's license. In some implementations, the system may use biometrics such as a fingerprint, retina scan, voice recognition, or other biometric to identify the driver. The identity of the driver can be cross referenced to determine that the driver has a digital driver's license.

The registration system 508 identifies that the driver of the car 502 may possess a digital driver's license.

In some implementations, the law enforcement officer may be informed by the individual that he has a digital driver's license.

The law enforcement officer may use his computer 506 to request the digital driver's license of the potential drivers from a digital ID system 512. The digital ID system 512 may include one or more disparate systems coordinating together. For example, the digital ID system 512 may include a digital ID provider (for example, the digital ID provider 314 of FIG. 3) and a Wallet Server (for example, the Wallet Server 312 of FIG. 3). In some implementations, secure communication between the client device 510 and a digital ID provider may be sent through a Wallet Server. Communications between the client device and the wallet server may be secured by the wallet server. Communications between the Wallet Server and the digital ID provider may be secured using a secret provided to the Wallet Server by the digital ID provider, as described above.

The law enforcement officer may also send the GPS location. In some implementations, the GPS device may be integrated into the computer 506, the GPS may be integrated into the law enforcement officer's vehicle 504, alternatively or additionally the GPS location may be integrated into the GPS device may be into a hand held device, scanner, or other device that is indicative of the location of the law enforcement officer. Communication with the digital ID system 512 may include a verification of the identity of the law enforcement officer. In some implementations, other information may be included, such as a code or comment describing the reason the identification is requested (for example, "traffic stop").

The digital ID system 512 may compare the location of the law enforcement officer (as determined by the GPS location) to the location of the registered devices of the potential drivers of the car 502. For example, the car may be insured to John Smith and Jane Smith. John Smith and Jane Smith may have each registered a smart phone (or other client device) with the digital ID system 512. In some scenarios, the GPS location of one or more devices may be available. For example, the driver of the car 502, may have enabled the GPS location using his digital wallet when he was pulled over. In other scenarios, the GPS location of the one or more devices may not be available. The digital ID system 512 may send a message or notification to the one or more devices asking them to enable their GPS location. In some implementations a wallet server (not shown) may act as an intermediary between the digital ID system 512 and the client device 510.

In some implementations, GPS location information for the requester (in this example, the law enforcement officer) and the holder of the digital driver's license may be maintained for only as long as necessary to provide the digital driver's license. The GPS information may be deleted once the digital driver's license is provided to the requester. In some implementations, GPS location information may be deleted after a predetermined period of time (for example, 10 minutes). Removal of GPS information can facility improved privacy for the sender and the recipient of the driver's license. Other measures to protect the privacy of the participants may be adopted, for example, records may by cryptographically stored, requesting and granting access to a digital ID may require close proximity, etc.

In some implementations, the request for the digital ID may be sent through another communication channel. For example, the user may receive an SMS text, push notification, email, etc. . . . The user may grant or deny permission to share the requested ID using the same mechanism. For example, the user may response to the SMS text, push notification, or email. In some implementations, the user may also receive a telephone call describing the request for ID. The user may be able to respond during the telephone call. For example, using an interactive voice response (IVR) system.

The user may accept or deny this request. For example, if John Smith is driving the car and Jane Smith is at work, then Jane may decide to deny the request. Similarly, if John Smith is driving the car and Jane Smith is a passenger, Jane may deny the request to facilitate providing accurate information about the driver to the law enforcement officer.

In some implementations, the law enforcement officer or other authorized individual may be able to request identity of the identity of the driver or individuals in a vehicle without notifying the individual of the request. For example, a signal can be send to a device in the car (such as a receiver, a mobile phone, an NFC device, etc.) which may provide the law enforcement officer with information sufficient to obtain digital driver's licenses or other ID's associated with the device.

The digital ID provider determines that the GPS location of the individual driving the car is close to the GPS location of the law enforcement officer requesting the digital driver's license. In some implementations, the GPS location of the law enforcement officer and the GPS location of the driver may be considered close if the reported distance between the two locations is within the margin of error of the GPS device. In some implementations, the location of the GPS location of the law enforcement officer and the GPS location of the driver may be considered close if the locations are within a predetermined distance (e.g., 10 feet, 20 feet, 30 feet, 40 feet) as reported by each GPS.

In this example, the digital ID system 512 identifies the driver as the probable individual from whom the driver's license is requested. The digital ID system 512 ask the driver to allow his driver's license to be shared with the law enforcement officer. As described above, the request may include the identity of the law enforcement officer along with verification that the law enforcement officer is authorized to request the driver's license.

If multiple devices are determined to be close to the law enforcement officer, the digital ID system 512 may send a request to each device. For example, John Smith may be driving the car 502 and Jane Smith may be a passenger. In this scenario, Jane Smith may elect not to share her driver's license with the law enforcement officer.

Referring to FIG. 5B, the driver of the car 502, provides permission for the law enforcement officer to receive his digital driver's license.

The digital ID system 512 can encrypt each driver's license, which was shared with the law enforcement officer, using a public key associated with the law enforcement officer. The law enforcement officer's computer decrypts the driver license(s) using the private key associate with the law enforcement officer. The law enforcement officer's computer 506 then display's the driver's licenses that have been shared with the officer.

Figure 6:
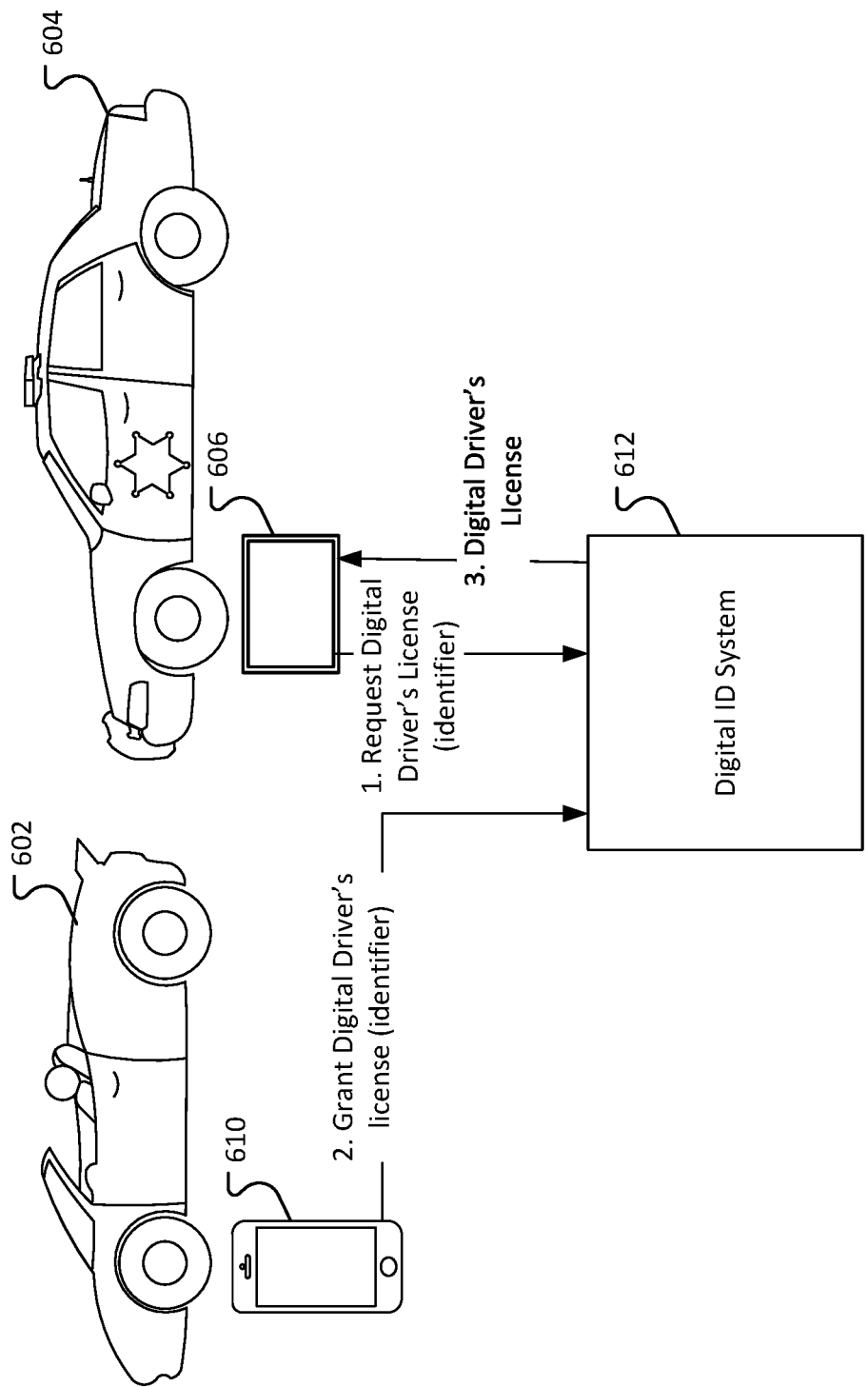
FIG. 6 illustrates another example of providing a digital identification document to a third party.

FIG. 6 illustrates another example of providing a digital identification document to a third party. While this example refers to a digital driver's license and a law enforcement officer, a similar process can be used to provide other forms of digital identification to other parties. For example, the process may be used to present a passport to an immigration or customs officer.

In this example, a car 602 is pulled over by a law enforcement officer 604. The law enforcement officer 604 obtains an identifier to request the digital driver's license of the driver of the car 602. The identifier may be an identifier associated with the car 602 (for example, a driver's license, an identifier provided on a decal, an NFC signal provided by a transponder, etc.) alternatively the identifier may be associated with the law enforcement officer (for example, the license plate of the law enforcement officer's vehicle, the law enforcement officer's badge number, etc.). The identifier can be added to the computer of the law enforcement office. In some implementations, the digital driver's license associated with the car may be determined by pairing between a mobile device 610 or other wearable device (such as a smart watch) in the car and the car (for example, using BLU-ETOOTH communications). In some implementations, the driver's license associated with the car may be determined using a biometric identifier (such as a fingerprint, or other biometric indication). A particular car may be associated with multiple digital IDs (such as driver's licenses). For example, a husband and wife may both be associated with a particular car. When a driver authenticates/pairs with the car with the other driver's license may be suppressed or deactivated for the duration of the drive.

In this example, the computer 606 sends the identifier to the digital ID system 612 requesting the digital driver's license). The driver of the car 602 sends his digital driver's license to the digital id system 612 using the same identifier. The digital ID system 612 matches the request with the grant of permissions (for example, using the identifier) and provides the digital driver's license to the computer 606 of the law enforcement officer.

In some implementations, when the digital driver's license is provided to the law enforcement officer, records of the transaction are removed from the digital ID system. In this example, the exchange of identifiers occurs between the driver and the law enforcement office. The exchange increases the likelihood that the sender of the driver's license and the recipient of the driver's license are in proximity without relying on GPS tracking technology.

Other methods may be used to determine that the driver possesses a digital driver's license. For example, a sticker or decal may be placed on the car to notify the law enforcement officer that the driver is likely to have a digital driver's license. In some implementations, the other method may also include an identifier (for example, number, bar code, QR code, etc.) that notifies that enables the law enforcement officer to look up the digital driver's licenses associated with the identifier.

Figure 7:
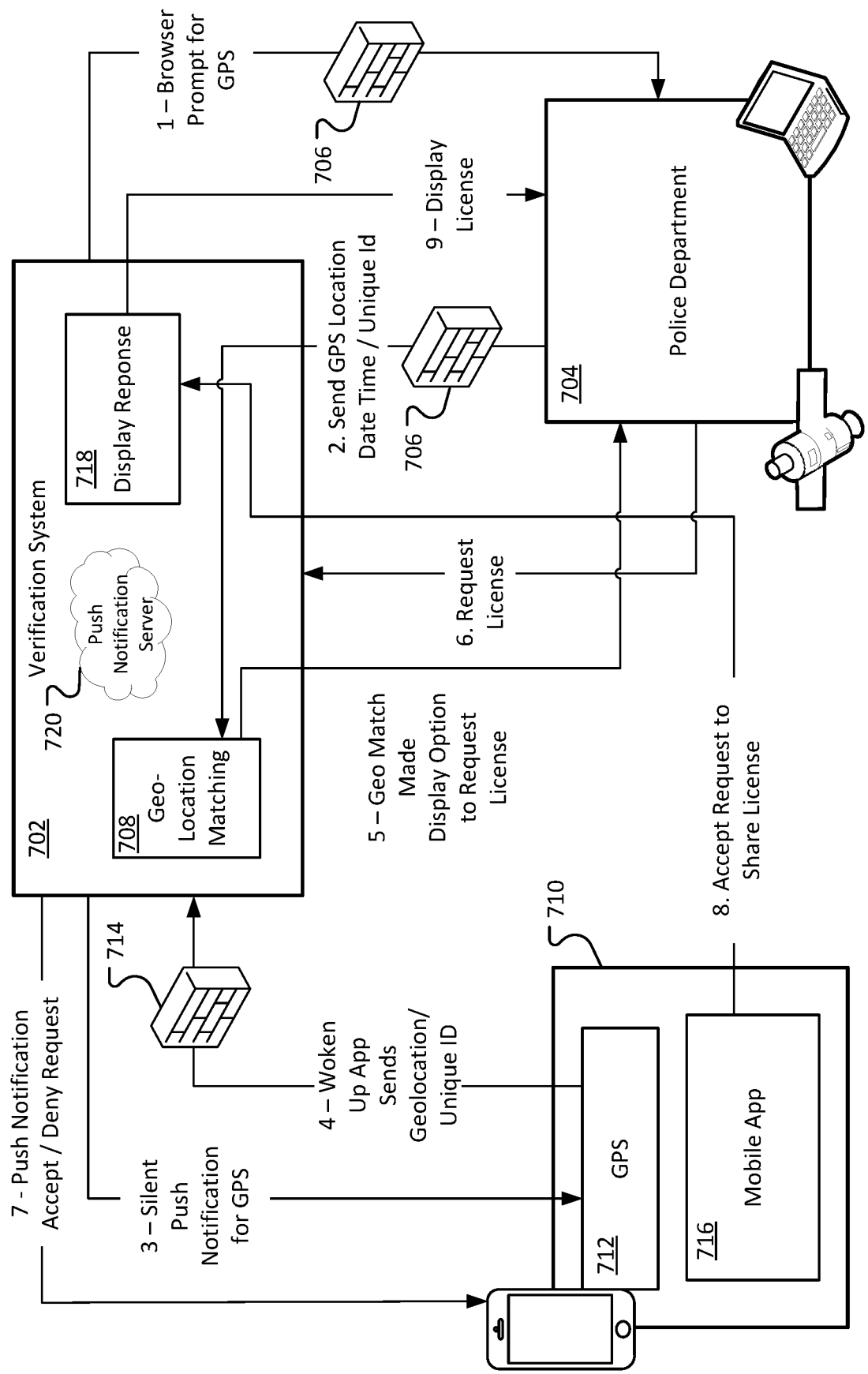
FIG. 7 illustrates an example of presenting a digital driver's license.

FIG. 7 illustrates an example of presenting a digital driver's license. In response to a request to view a digital driver's license (not shown for simplicity), a verification system 702 obtains a GPS location of the requesting law enforcement officer (step 1). The GPS location can be obtained from the police department 704 by querying a server it controls that manages locations of law enforcement officers. Alternatively, the GPS location can be obtained directly from the law enforcement officer who requested to view the digital driver's license using either their browser location function or an on-vehicle GPS device.

The request may be transmitted through a firewall 706 of the police department. The request may be distributed by the police department to a particular police vehicle or officer who wishes to view the digital driver's license material. The police department 704 (or law enforcement officer) sends a GPS location through the firewall 706 to the to a geolocation matching service 708 (step 2).

Generally, both the police department system 704 and the verification system 702 may maintain network security features such as firewalls (for example, firewall 706 and firewall 714). Communication to and from these systems may pass through these network security features.

Using the information provided by the police department 704, the verification system 702 sends a silent push request to the client device 710 of the individual for whom the driver's license is requested (step 3). If the individual has opted in to providing a digital driver's license, the client device 710 can send the GPS location (provided by a GPS device 712) to the geo-location matching service 708 (step 4). The information may be provided through the firewall 714 of the verification system 702.

The geo-location matching service 708 matches the GPS location provided by the client device 710 with the GPS location provided by the police department 704. When a match is identified, the police department 704 is notified of the match (step 5).

The police department 704 may request the driver's license from the verification system 702 (step 6). The verification system may include or work with a push notification server 720. The verification server 702 causes a push notification to be send to the mobile app 716 on the client device 710 (step 7). The individual may be presented with the option to provide their digital driver's license to the police department. If the individual agrees to present their digital driver's license, a message may be sent to the display response 718 on the verification system 702 (step 8). The indication of acceptance is transmitted to the police department 704 (step 9) thereby enabling the police department 704 to obtain and display the driver's license.

Figure 8:
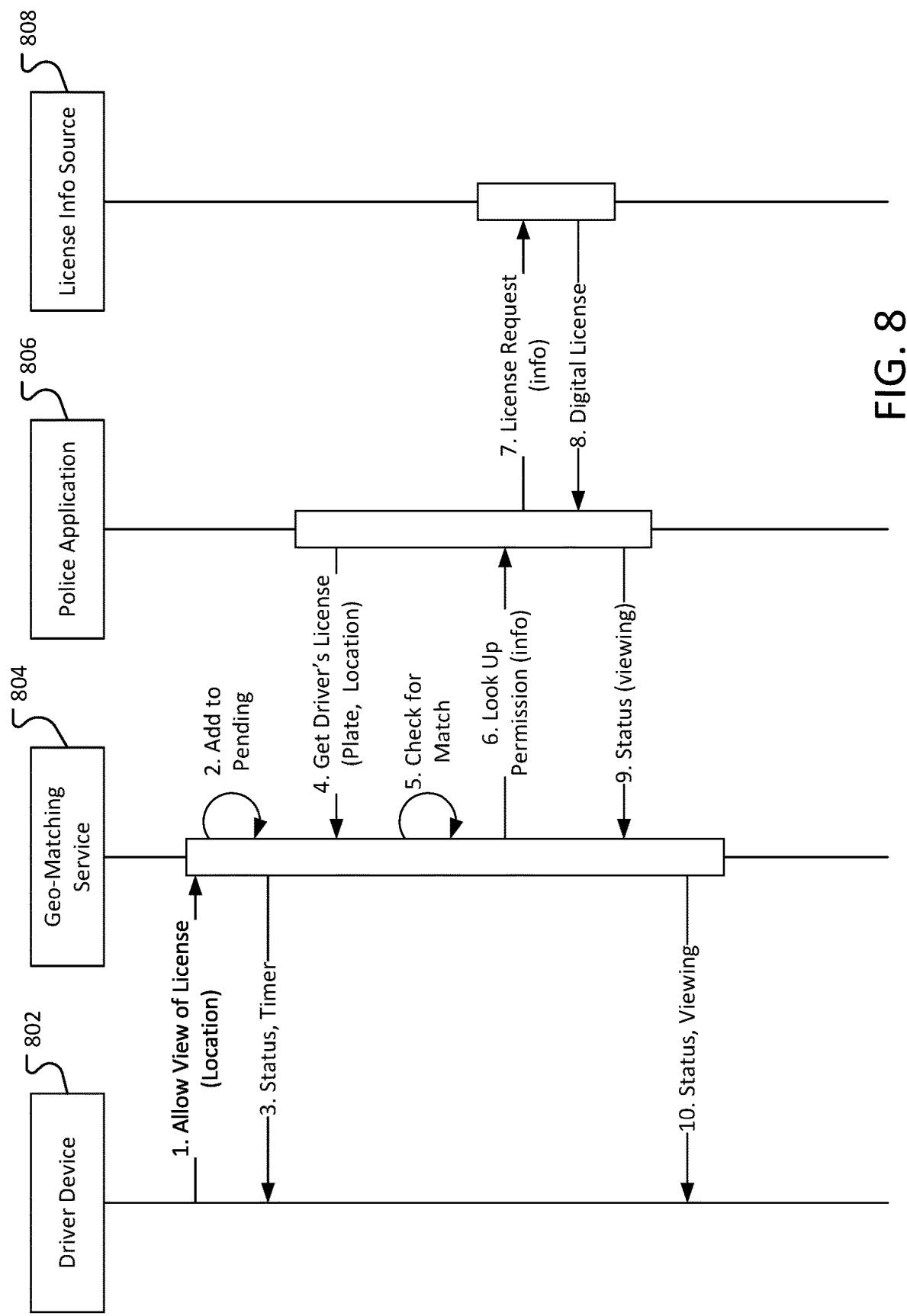
FIG. 8 is a sequence diagram illustrating an example presenting a digital driver's license to a law enforcement office.

FIG. 8 is a sequence diagram illustrating an example of presenting a digital driver's license to a law enforcement officer. In this example, the driver proactively shares his digital driver's license before it is requested by the law enforcement officer.

The driver device 802 informs the geo-matching service 804 that the individual is authorizing the sharing of his digital driver's license with authorized parties (such as a law enforcement officer) (step 1). The driver device 802 provides the location of the driver device 802 (for example, a GPS location).

The geo-matching service 804 adds the location and permission to a list of pre-authorizations (step 2). While described as a list for simplicity, other data structures may be used, for example, a dictionary, a hash table, a lookup table, etc.

The geo-matching service 804 informs the driver device 802 that the request is pending and provides a timer, indicating for how long the pending request is valid (step 3).

In some implementations, the preauthorization to view a digital driver's license may be limited in time, for example, for 1 minute, for 5 minutes, for 10 minutes, etc.

Before the timer expires (that is, while the pre-authorization to view the digital driver's license is valid), a police application 806 requests the driver's license from the geo-matching service 804 (step 4). The request may include information that can be used to identify the individual (for example, a license plate number). The request may also include the location of the law enforcement officer making the request.

The geo-matching service compares the information in the request from the law enforcement officer with entries in the list of pre-authorizations (step 5). The geo-location service can use the location provided by the driver device 802, the location provided by the police application 806, and/or the identifying information (e.g., a license plate number) provide by the police application 806 to identify the individual for whom the law enforcement officer is requesting the license.

In this example, the geo-location service 804 identifies that the individual has pre-authorized sharing of the digital driver's license. The geo-location service 804 sends information about the license to the police application 806 (step 6).

Using the information about the license, the police application 806 requests the digital driver's license from a license information source 808 (step 7). The license information source can be, for example, a registry of motor vehicles or other governmental or private institution.

The license information source 808 provides the digital driver's license to the police application 806 (step 8).

The police application 806 informs the geo-matching service 804 that the law enforcement officer is viewing the digital driver's license (step 9).

The geo-matching service 804 informs the driver device 802 that the law enforcement officer is viewing the digital driver's license (step 10).

Figure 9:
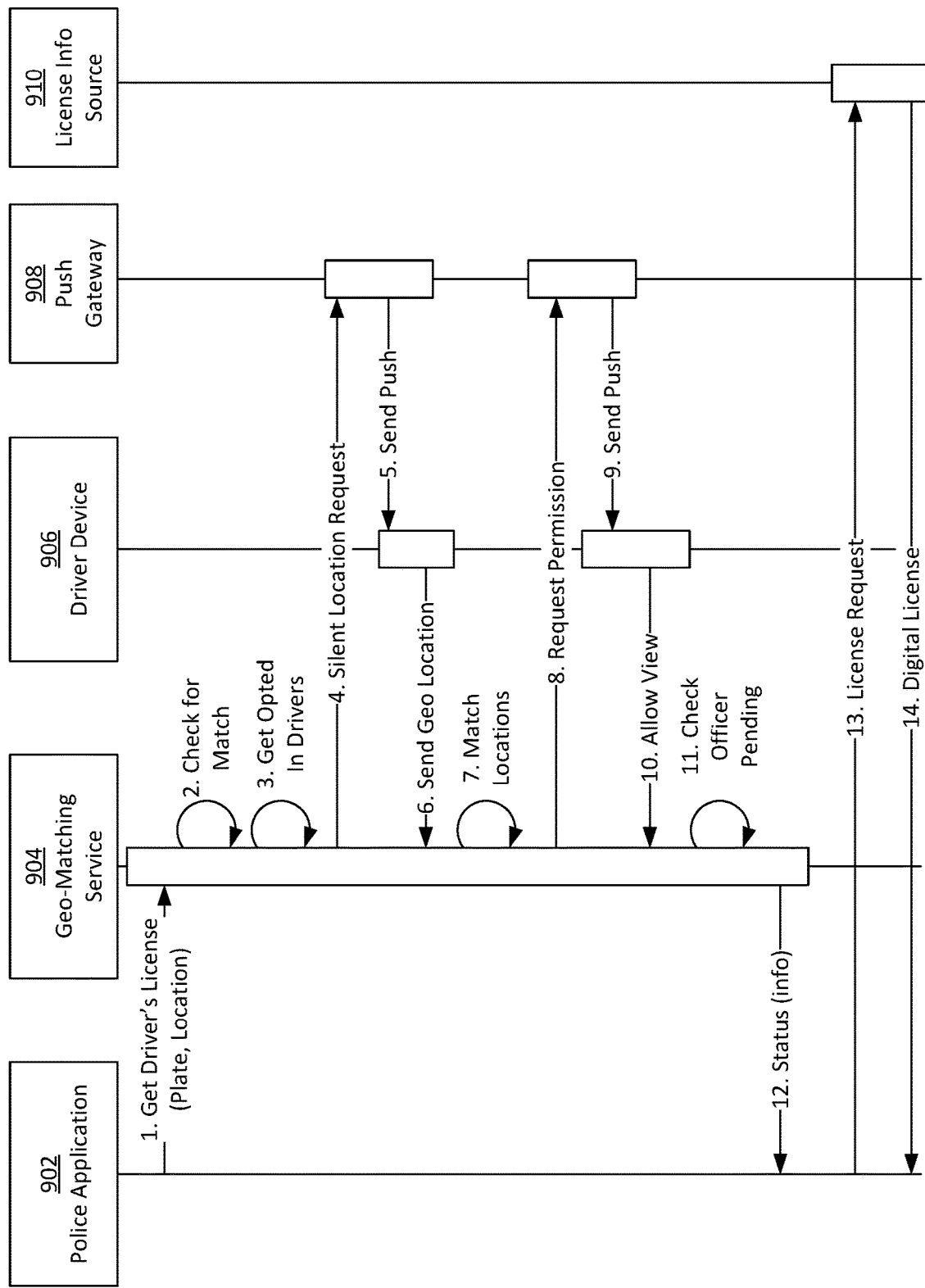
FIG. 9 is a sequence diagram illustrating an example presenting a digital driver's license to a law enforcement office.

FIG. 9 is a sequence diagram illustrating an example of presenting a digital driver's license to a law enforcement officer. In this example, the individual reacts to a request for his driver's license by a law enforcement officer.

A police application 902 requests the driver's license from the geo-matching service 904 (step 1). The request may include information that can be used to identify the individual (for example, a license plate number). The request may also include the location of the law enforcement officer making the request.

The geo-matching service 904 compares the information in the request from the law enforcement officer with the list of pre-authorizations (step 2). In this example, the geo-matching service 904 does not find a pre-authorization. The geo-matching service 904, determines whether an individual associated with the license plate number (or other identifying information provided by the police application 902) has opted-in to the digital driver's license (step 3).

In this example, the geo-matching service 904 identifies a driver device 906 associated with the information provided by the police application 902. The geo-matching service 904 sends a silent location request to a push gateway 908 (step 4).

The push gateway 908 pushes the silent location request to a driver device 906 (step 5).

The driver device 906 sends its location to the geo-matching service 904 (step 6.).

The geo-matching service 904 compares the information in the request from the law enforcement officer and the information from the driver device 906 (step 7). Once the geo-matching service 904 matches the request from the police application 902 with the information provided by the driver device 906, the geo-matching service 904 sends a request for permission to share the digital driver's license to the push gateway 908 (step 8).

The push gateway 908 pushes the request to the driver device 906 (step 9). The request for permission may be displayed on the user interface of the driver device. The user of the driver device may elect to share the digital driver's license. In some implementations, the user may be required to authenticate with the device and/or the geo-marching service prior to sharing the driver's license.

Once the user elects to share the digital driver's license, the driver device 906 informs the geo-matching service 904 that the request has been authorized by the user (step 10).

The geo-matching service identifies the law enforcement officer request for the driver's license (step 11). Pending law enforcement officer requests may be stored in a data structure such as a list, collection, hash table, lookup table, dictionary, or other similar mechanism.

The geo-matching service 904 provides information about the license to the police application 902 (step 12.) The information may be information sufficient of obtain the digital driver's license (for example, a driver's license number, a token, or other mechanism).

Using the information about the license, the police application 902 requests the digital driver's license from a license information source 910 (step 13). The license information source can be, for example, a registry of motor vehicles or other governmental or private institution.

The license information source 910 provides the digital driver's license to the police application 902 (step 14).

Figure 10:
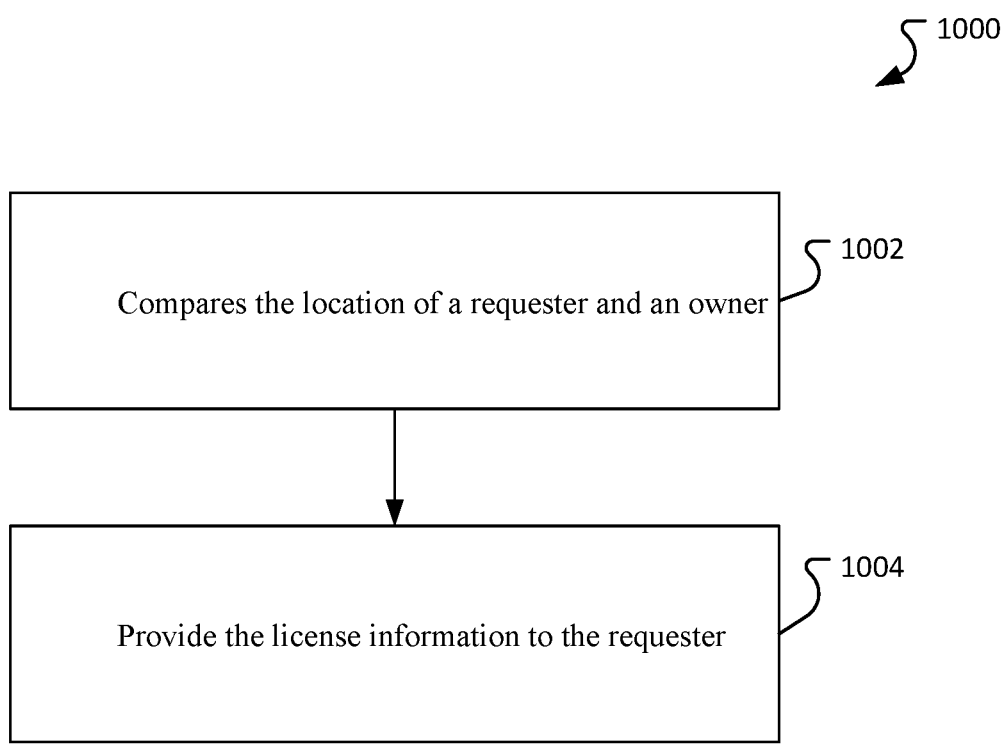
FIG. 10 is a flowchart of an example process for providing a digital driver's license to a requester.

FIG. 10 is a flowchart of an example process for providing a digital driver's license to a requester.

The process 1000 compares 1002 the location of a requester of a digital identification and an owner of the digital identification. The location of the owner may be obtained without notifying the owner.

The process 1000 may receive authorization to share the information from the owner. The authorization may be made before or after the requester requests the driver's license. An authorization that is made before the requester requests the driver's license may only be valid for a predetermined period of time.

The process 1000 provides 1004 the license information to the requester.

Figure 11:
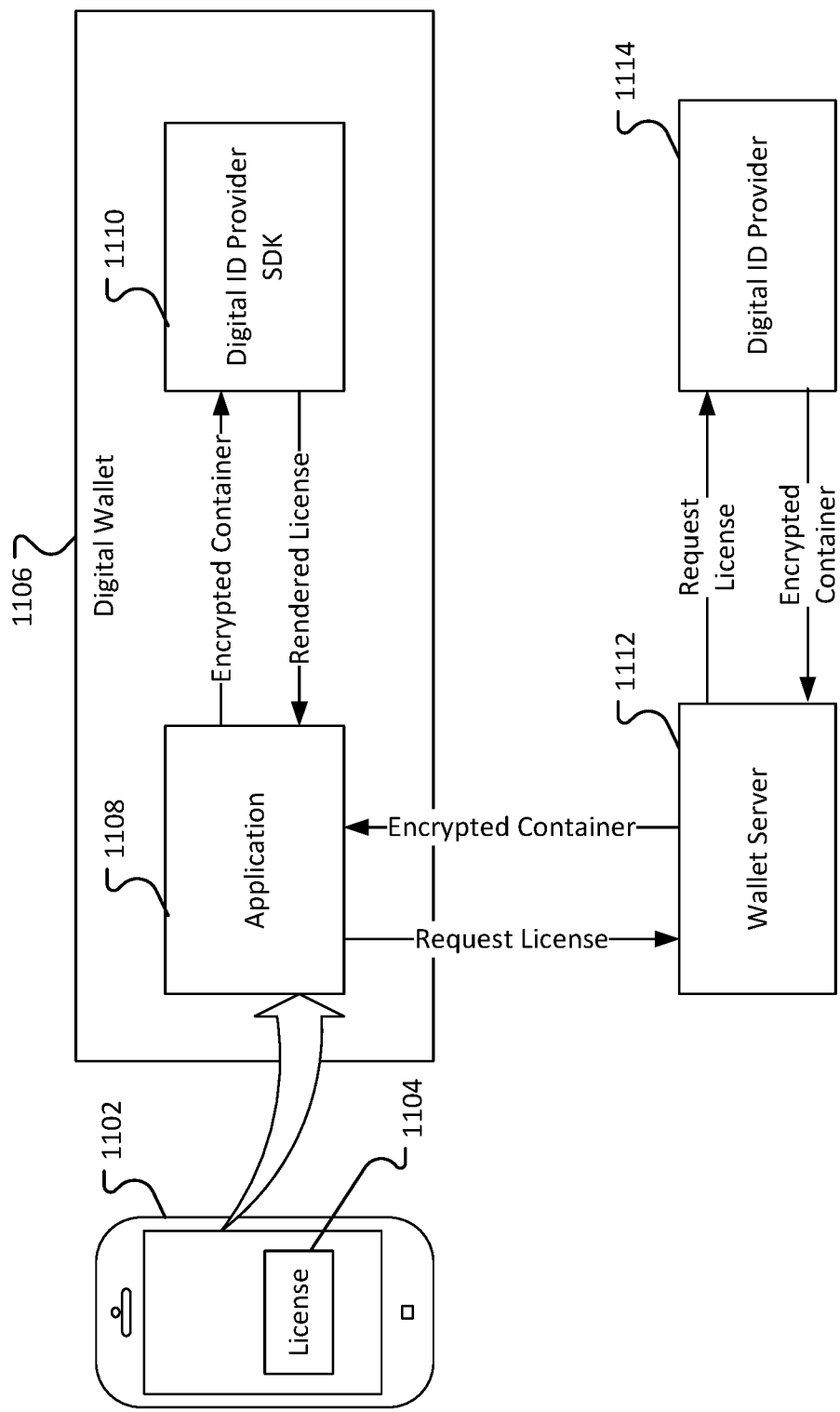
FIG. 11 illustrates providing a digital ID to a mobile device.

FIG. 11 illustrates providing a digital ID to a mobile device. One way to enhance the security of the personally identifiable information possessed by the user of the digital wallet 1106 is to limit the ability of the wallet server 1112 and the digital wallet 1106 from reading private information from the license, identification, or other item provided by the digital ID provider 1114. Security can be enhanced by providing the requested item in an encrypted container that prevents the wallet server or unauthorized applications from reading the digital ID. For example, a user of a mobile device 1102 to may select a button on the mobile device 1102. In response the digital wallet 1106 executing on the mobile device 1102 may access the digital ID application 1108. The digital ID application 1108 may request the license from a wallet server 1112. As discussed above, the wallet server 1112 may have authenticated the user of the mobile device 1102 in order to ensure that the user of the mobile device 1100 to is authorized to access the digital license.

After verifying that the user of the mobile device 1102 is authorized to access the digital device, the wallet server 1112 may request the license from the digital ID provider 1114. As discussed above, communications between the wallet server 1112 and the digital ID provider 1114 may be secured using encryption where the secure keys are located on the wallet server 1112 and the digital ID provider 1114, and are not available to the mobile device 1102.

The digital ID provider 1114 may provide a license that can be rendered on a display to the wallet server 1112 in an encrypted container. The encrypted container may be encrypted using an encryption key that is not available to the wallet server 1112 but may be accessed by the mobile device 1102, as discussed further below.

The wallet server 1112 provides the encrypted container to the application 1108. The application 1108 provides the encrypted container to the digital ID provider SDK 1110. The digital ID provider SDK 1110 may decrypt the encrypted container and use the information contained in the encrypted container to render the license. In some imple-mentations, for example, the encrypted container may include an image file of the license. In other implementations, the encrypted container may include data that describes the license and information that describes how to render the license.

In some implementations, the digital ID provider SDK may be allocated an encryption key that is capable of decrypting the rendered license. The digital ID provider SDK may have been provided the encryption key when the mobile device registered with the digital id provider or alternatively, the encryption key may be provided on an as needed basis to the mobile device, as discussed below with respect to FIG. 12.

The rendered license may be provided from the digital ID provider 1110 to the application 1108 for display on the mobile device 1102 or may be displayed on the mobile device 1102 by the Digital ID Provider SDK 1110. For example, the Digital Wallet 1106 may provide a location on the user interface of the mobile device 1102 that can be used to display the license. The Digital Wallet 1106 may inform the Digital ID Provider SDK 1110 of the location, and the Digital ID Provider SDK may cause the license to render within the location. In this manner, neither the digital wallet 1106 nor the application 1108 accesses the information within the license. This display technique may be used with other implementations and examples, for example, those described below with respect to FIGS. 12 and 13.

In some implementations, the mobile device only stored the encrypted container in persistent memory and does not store the rendered license in the persistent storage. In other implementations, the mobile device may not store either the encrypted container or the rendered license in persistent storage.

Figure 12:
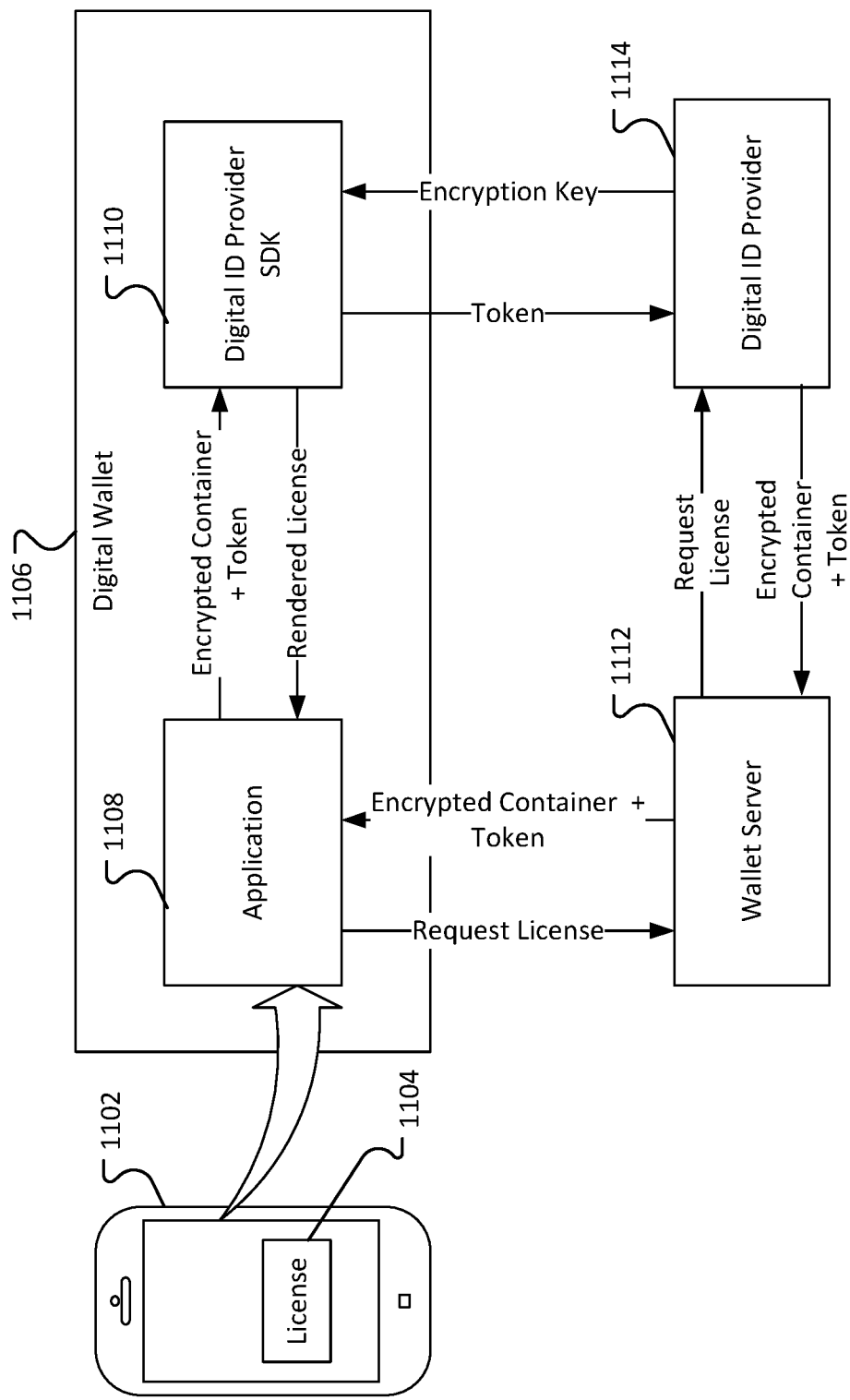
FIG. 12 illustrates one method of providing an encryption key to the digital ID provider SDK.

FIG. 12 illustrates one method of providing an encryption key to the digital ID provider SDK 1110.

As described above, the user of the mobile device 1102 requests the digital license by selecting a button 1104 (or other item) on the display of the mobile device 1102. The digital wallet 1106 on the mobile device 1102 includes an application 1108 that is configured to access a wallet server 1112. The application 1108 sends a message to the wallet server 1112 requesting the license. The wallet server 1112 requests the license from the digital ID provider 1114. In this implementation, the digital ID provider 1114 provides an encrypted container and a token that can be used to obtain the encryption key capable of decrypting the encrypted container. For example, the digital ID provider 1114 may store the encryption key in a location that can be identified by using the token.

The wallet server 1112 provides the Encrypted Container and the token to the application 1108. The application provides the encrypted container and the token to the digital id provider SDK 1110. The digital ID provider SDK 1110 sends the token to the digital ID provider 1114. In some implementations, the token may be sent along with information that can be used by the digital id provider 1114 to verify the mobile device 1102. For example, the user may send an access code, information that can be compared to the user (such as, for example, birthdate, height, etc.), a password, biometric data, or any other information that can be used to verify the mobile device 1102. In some implementations, the token is sufficient to verify the mobile device 1102.

In response to receiving the token, the digital ID provider 1114 provides the encryption key to the digital ID provider SDK. The digital ID provider SDK uses the encryption key to decrypt the encryption container and provides the rendered license to the application 1108 or causes the rendered license to be displayed on the display of the mobile device 1102 as described above.

Figure 13:
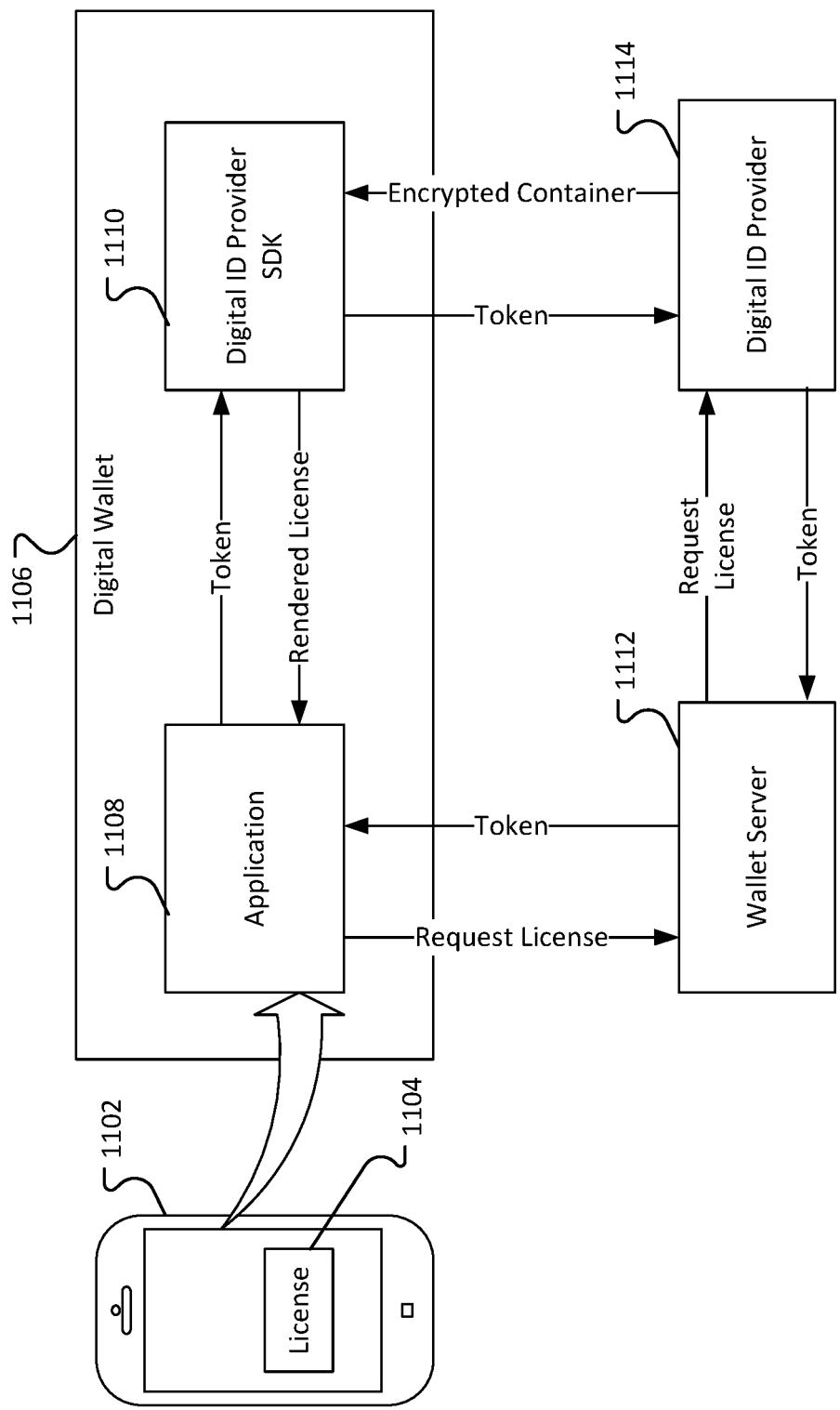
FIG. 13 illustrates another method of providing an encryption key to the digital ID provider SDK 1110.

FIG. 13 illustrates another method of providing an encryption key to the digital ID provider SDK 1110.

As described above, the user of the mobile device 1102 requests the digital license by selecting a button 1104 (or other item) on the display of the mobile device 1102. The digital wallet 1106 on the mobile device 1102 includes an application 1108 that is configured to access a wallet server 1112. The application 1108 sends a message to the wallet server 1112 requesting the license. The wallet server 1112 requests the license from the digital ID provider 1114. In this implementation, the digital ID provider 1114 provides a token that can be used to obtain the encrypted container. The encryption key may be stored on the mobile device by the Digital ID Provider SDK.

The wallet server 1112 provides the token to the application 1108. The application provides the token to the digital id provider SDK 1110. The digital ID provider SDK 1110 sends the token to the digital ID provider 1114. In some implementations, the token may be sent along with information that can be used by the digital ID provider 1114 to verify the mobile device 1102. For example, the user may send an access code, information that can be compared to the user (for example, birthdate, height, etc.), a password, biometric data, or any other information that can be used to verify the mobile device 1102. In some implementations, the token is sufficient to verify the mobile device 1102.

In response to receiving the token, the digital ID provider 1114 provides the encrypted container to the digital ID provider SDK. The digital ID provider SDK uses the encryption key to decrypt the encryption contain and provides the rendered license to the application 1108 or causes the rendered license to be displayed on the display of the mobile device 1102 as described above.

In some implementations, the Wallet SDK is not able to decrypt the payload but instead only confirm tokens and display the payload. For example, if the ID provided failed to format the driver's licenses correctly or displayed incorrect information on the driver's license the wallet SDK would not be able to determine the validity of the information, instead, the responsibility of providing the correct license is entirely with the ID provider.

Figure 14:
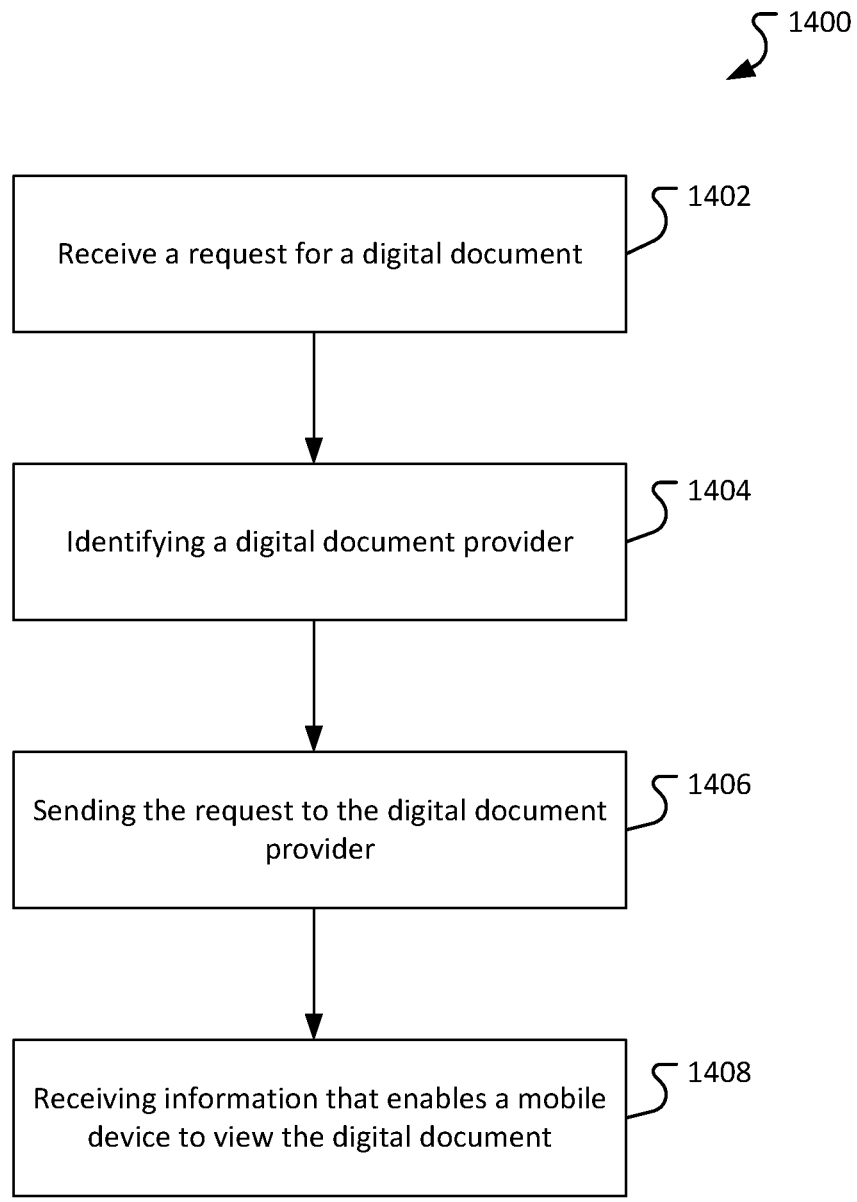
FIG. 14 is a flowchart of an exemplary process for providing a digital document to a device.

FIG. 14 is a flowchart of an exemplary process 1400 for providing a digital document to a device. The process may be performed by a computer system, for example, a wallet server.

The process 1400 receives 1402 a request for a digital document. The digital document may be, for example, a form of identification (such as a driver's license, a military ID, etc.). The digital document may also be a document that identifies the user as having certain rights and/or obligations (such as a hunting license, a gun permit, etc.).

The process 1400 identifies 1404 a digital document provider that can provide the requested document. For example, different states may each provide digital driver's license using different systems, alternatively different types of documents may be provided by different providers.

The process 1400 sends 1406 the request to the identified digital document provider 1406. In some implementations, the process 1400 may validate itself with the digital document provider using an authentication protocol.

The process 1400 receives 1408 information that enables a mobile device to view the digital document. The information may be a token, the token that enables the device to obtain the digital document from the digital id provider. The information may be the digital document encrypted using an encryption key. The key to decrypt the digital document may be stored on the mobile device. The information further may include a token that the mobile device sends to the digital document provider, and the digital document provider sends the key to decrypt the encryption container to the mobile device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs (i.e., one or more modules of computer program instructions, encoded on computer storage mediums for execution by, or to control the operation of, data processing apparatus). A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices). The computer storage medium can be non-transitory.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example, a programmable processor, a computer, a system on a chip, or multiple ones, or combinations, of the foregoing The apparatus can include special purpose logic circuitry (e.g., an FPGA (field programmable gate array) or an ASIC (application-specific integrated circuit)). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA (field programmable gate array) or an ASIC (application-specific integrated circuit)).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive, data from or transfer data to, or both, one or more mass storage devices for storing data (e.g., magnetic, magneto-optical disks, or optical disks), however, a computer need not have such devices. Moreover, a computer can be embedded in another device (e.g., a mobile telephone, a personal digital assistant (PDA), a mobile audio or video player, a game console, a Global Positioning system (GPS) receiver, or a portable storage device (e.g., a universal serial bus (USB) flash drive)), to name just a few. Devices suitable for storing computer program instructions and data include all forms of non-volatile memory, media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback) and input from the user can be received in any form, including acoustic, speech, or tactile input. In addition, a computer can interact with a user by sending documents to and receiving documents from a device that is used by the user (for example, by sending web pages to a web browser on a user's user device in response to requests received from the web browser).

Embodiments of the subject matter described in this specification can be implemented in a computing system that includes a back-end component (e.g., as a data server), a middleware component (e.g., an application server), or a front-end component (e.g., a user computer having a graphical user interface or a Web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method executing on a computer system comprising:
receiving, by the computer system from a digital wallet application on a mobile device, a request for a digital document to be sent to the digital wallet application;
identifying, by the computer system, a digital document provider system capable of providing the requested document by determining that a digital document provider software development kit (SDK) on the mobile device is configured to authorize the mobile device to access the digital document provider system;
sending, by the computer system, the request for the digital document to the identified digital document provider system;
receiving, by the computer system from the identified digital document provider system, an encrypted container and a token, the encrypted container comprising the digital document, wherein:

the digital document comprises an encrypted digital document;

the encrypted container cannot be decrypted by the digital wallet application and the computer system; and the token identifies a location at the identified digital document provider system on which an encryption key capable of decrypting the encrypted container is stored; and sending, by the computer system, the encrypted container and the token to the digital wallet application, wherein the encrypted container and token are transmittable by the digital wallet application to the digital document provider SDK, and wherein the digital document provider SDK is configured to:

transmit the token to the identified digital document provider system for receiving the encryption key capable of decrypting the encrypted container;

decrypt the encrypted digital document using a second encryption key, the second encryption key being stored on the mobile device; and render the digital document based on the decrypted container via a display of the mobile device.

2. The method of claim 1, further comprising authenticating, by the computer system, a user of the mobile device.

3. A non-transitory computer storage medium encoded with computer program instructions, that when executed by one or more computers, cause the one or more computers to perform operations comprising:

receiving, from a digital wallet application on a mobile device, a request for a digital document to be send to the digital wallet application;

identifying a digital document provider system capable of providing the requested document by determining that a digital document provider software development kit (SDK) on the mobile device is configured to authorize the mobile device to access the digital document provider system;

sending the request for the digital document to the identified digital document provider system;

receiving, from the identified digital document provider system, an encrypted container and a token, the encrypted container comprising the digital document, wherein:

the digital document comprises an encrypted digital document;

the encrypted container cannot be decrypted by the digital wallet application and the one or more computers; and the token identifies a location at the identified digital document provider system on which an encryption key capable of decrypting the encrypted container is stored; and sending the encrypted container and the token to the digital wallet application, wherein the encrypted container and the token are transmittable by the digital wallet application to the digital document provider SDK, and wherein the digital document provider SDK is configured to:

transmit the token to the identified digital document provider system for receiving the encryption key capable of decrypting the encrypted container;

decrypt the encrypted digital document using a second encryption key, the second encryption key being stored on the mobile device; and render the digital document based on the decrypted container via a display of the mobile device.

4. The non-transitory computer storage medium of claim 3, wherein the operations further comprise authenticating a user of the mobile device.

5. A system comprising:

one or more computers and one or more storage devices storing instructions that are operable, when executed by the one or more computers, to cause the one or more computers to perform operations comprising:

receiving, from a digital wallet application on a mobile device, a request for a digital document to be send to the digital wallet application;

identifying a digital document provider system capable of providing the requested document by determining that a digital document provider software development kit (SDK) on the mobile device is configured to authorize the mobile device to access the digital document provider system;

sending the request for the digital document to the identified digital document provider system;

receiving, from the identified digital document provider system, an encrypted container and a token, the encrypted container comprising the digital document, wherein:

the digital document comprises an encrypted digital document;

the encrypted container cannot be decrypted by the digital wallet application and the one or more computers; and the token identifies a location at the identified digital document provider system on which an encryption key capable of decrypting the encrypted container is stored; and sending the encrypted container and the token to the digital wallet application, wherein the encrypted container and the token are transmittable by the digital wallet application to the digital document provider SDK, and wherein the digital document provider SDK is configured to:

transmit the token to the identified digital document provider system for receiving the encryption key capable of decrypting the encrypted container;

decrypt the encrypted digital document using a second encryption key, the second encryption key being stored on the mobile device; and render the digital document based on the decrypted container via a display of the mobile device.

6. The system of claim 5, wherein the operations further comprise authenticating a user of the mobile device.

* * * * *